(12) United States Patent
Hikida et al.

(10) Patent No.: US 9,074,669 B2
(45) Date of Patent: Jul. 7, 2015

(54) DRIVE UNIT

(71) Applicant: ASMO CO., LTD., Shizuoka-ken (JP)

(72) Inventors: Keigo Hikida, Toyohashi (JP); Takeshi Tanabe, Kosai (JP); Masaki Kobayashi, Toyohashi (JP)

(73) Assignee: Asmo Co., Ltd., Shizuoka-ken (JP)

( * ) Notice: Subject to any disclaimer, the term of this patent is extended or adjusted under 35 U.S.C. 154(b) by 170 days.

(21) Appl. No.: 13/690,412

(22) Filed: Nov. 30, 2012

(65) Prior Publication Data

US 2013/0139620 A1 Jun. 6, 2013

(30) Foreign Application Priority Data

Dec. 6, 2011 (JP) ................................ 2011-267250
Jan. 20, 2012 (JP) ................................ 2012-010352

(51) Int. Cl.
*B60S 1/24* (2006.01)
*B60S 1/26* (2006.01)
*B60S 1/34* (2006.01)
*F16H 21/40* (2006.01)
*B60S 1/16* (2006.01)

(52) U.S. Cl.
CPC ............ *F16H 21/40* (2013.01); *Y10T 74/18232* (2015.01); *B60S 1/24* (2013.01); *B60S 1/26* (2013.01); *B60S 1/3436* (2013.01); *B60S 1/166* (2013.01); *B60S 1/3402* (2013.01); *B60S 1/3495* (2013.01)

(58) Field of Classification Search
CPC ............ B60S 1/18; B60S 1/26; B60S 1/3495; B60S 1/3402; B60S 1/166; B60S 1/163; B60S 1/24; B60S 1/3436; F16H 21/40; Y10T 74/18232

USPC ................. 15/250.3, 250.31, 250.21, 250.23, 15/250.13; 74/20, 25, 33, 47, 48; 310/80, 310/83

See application file for complete search history.

(56) References Cited

U.S. PATENT DOCUMENTS

| | | | | |
|---|---|---|---|---|
| 1,227,100 | A * | 5/1917 | Wall | 15/250.3 |
| 1,355,728 | A * | 10/1920 | Bennett | 15/250.3 |
| 1,447,541 | A * | 3/1923 | Gates | 15/250.203 |
| 1,506,132 | A * | 8/1924 | Oishei | 15/250.3 |
| 1,608,985 | A * | 11/1926 | McCaleb | 318/257 |
| 2,494,538 | A * | 1/1950 | Baldo | 74/79 |
| 4,585,980 | A | 4/1986 | Gille et al. | |
| 5,369,837 | A * | 12/1994 | Chevroulet | 15/250.21 |
| 8,136,199 | B2 * | 3/2012 | Nakamura et al. | 15/250.3 |
| 2007/0261191 | A1 | 11/2007 | Yagi | |

FOREIGN PATENT DOCUMENTS

| | | |
|---|---|---|
| JP | 53-26035 U | 3/1978 |
| JP | 58-157756 U | 10/1983 |
| JP | 59-120551 | 7/1984 |
| JP | 61-27742 A | 2/1986 |

(Continued)

*Primary Examiner* — Gary Graham
(74) *Attorney, Agent, or Firm* — Christensen Fonder P.A.

(57) ABSTRACT

A drive unit includes an output shaft, a drive source, which causes the output shaft to rotate in a reciprocating manner within a first angular range, an arcuate movement portion, which performs arcuate movement about the axis of the output shaft as the shaft is rotated, a pivot shaft, and a lever member, which is rotational about the axis of the pivot shaft. As the arcuate movement portion performs arcuate movement, the lever member is rotated, in a reciprocating manner within a second angular range, while changing the engaging position with the arcuate movement portion.

19 Claims, 7 Drawing Sheets

(56) References Cited

FOREIGN PATENT DOCUMENTS

| | | |
|---|---|---|
| JP | 7-047930 A | 2/1995 |
| JP | 2003-112609 A | 4/2003 |
| JP | 2007-302038 A | 11/2007 |
| JP | 2008-035629 | 2/2008 |

* cited by examiner

DRIVE UNIT

BACKGROUND OF THE INVENTION

The present invention relates to a drive unit such as a wiper device.

Conventionally, direct drive wiper devices have been proposed as one type of drive units. A direct drive wiper device includes a motor main body, which is a drive source. The output shaft of the motor main body is directly fixed to a wiper. For example, refer to Japanese Laid-Open Patent Publication No. 59-120551. Another type of wiper device uses a four-bar linkage, in which, when the output shaft is rotated one rotation, the wiper is caused to reciprocate (swing) once within an angle range of 90 degrees or 110 degrees. For example, refer to Japanese Laid-Open Patent Publication No. 2008-35629. Compared to a direct drive wiper device, a wiper device using a four-bar linkage increases the torque that acts from the output shaft to the wiper (the four-bar linkage). Thus, it is possible to reduce the torque (the torque of the output shaft) that is generated by a drive source (a motor main body and a worm gear in the example of Japanese Laid-Open Patent Publication No. 59-120551) and is required for rotating the wiper with a predetermined torque.

However, in recent years, to facilitate installation of wiper devices to vehicles, the size of drive source in drive units have been desired to be reduced. Specifically, in a case where a drive source is a motor main body, the motor main body is desired to be reduced in size. In a case where a drive source includes a motor main body and a reduction gear, at least one of the motor main body and the reduction gear is desired to be reduced in size.

SUMMARY OF THE INVENTION

Accordingly, it is an objective of the present invention to provide a drive unit that reduces the size of a drive source, thereby facilitating the installation.

To achieve the foregoing objective and in accordance with one aspect of the present invention, a drive unit having an output shaft and a drive source is provided. The drive source causes the output shaft to rotate in a reciprocating manner within a first angular range larger than 180° and less than 360°. An arcuate movement portion is located at a position offset from the axis of the output shaft and is integrally rotational with the output shaft. The arcuate movement portion performs arcuate movement about the axis of the output shaft as the output shaft is rotated. A pivot shaft is located at a position offset from the axis of the output shaft. A lever member is rotational about the axis of the pivot shaft and is engaged with the arcuate movement portion. As the arcuate movement portion performs arcuate movement, the lever member is urged by the arcuate movement portion while an engaging position between the arcuate movement portion and the lever member varies. The lever member is rotated in a reciprocating manner within a second angular range, which is smaller than the first angular range, to cause a driven member to integrally rotate in a reciprocating manner.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A drive unit according to the present invention, which is a wiper device in one embodiment, will now be described with reference to FIGS. 1 to 5.

Figure 1:
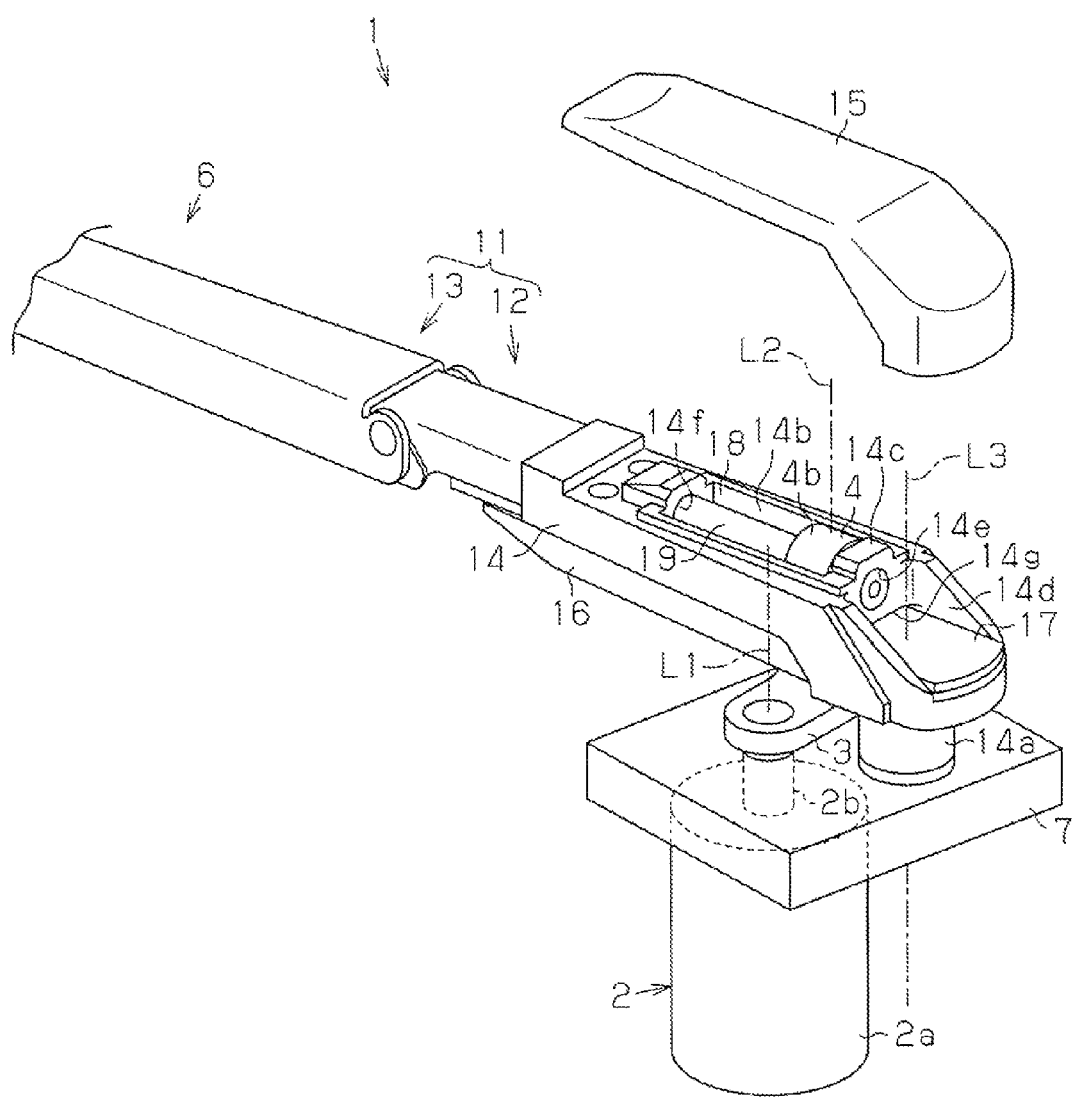
FIG. 1 is a partially exploded perspective view illustrating a wiper device according to one embodiment of the present invention.
Figure 2:
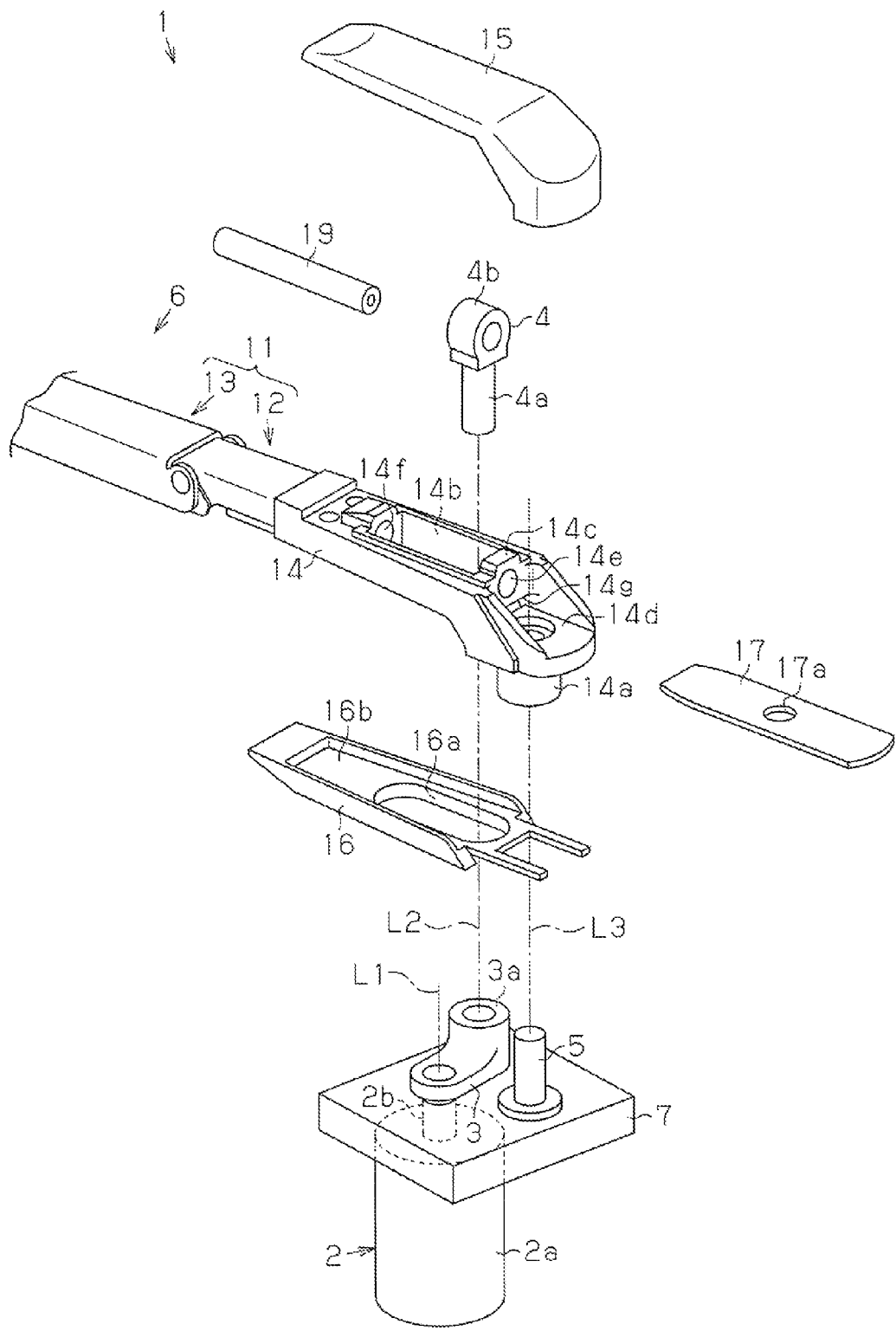
FIG. 2 is an exploded perspective view of the wiper device shown in FIG. 1.

As shown in FIGS. 1 and 2, a wiper device 1 includes a motor main body 2 serving as a drive source, a crank arm 3, a slide member 4, a pivot shaft 5 (see FIG. 2), and a wiper 6 serving as a driven member.

The motor main body 2 includes a motor housing 2a and an output shaft 2b. A base 7 is fixed to a vehicle body (not shown), and the motor housing 2a is fixed to the back surface (the surface facing the interior of the vehicle). The output shaft 2b extends through the base 7 and protrudes from the front surface (the surface facing the outside of the vehicle). For example, a sensor for detecting the rotational angle of the output shaft 2b is arranged in the motor housing 2a. Based on manipulation of an operation switch, the motor main body 2 causes the output shaft to rotate in a reciprocating manner within an angular range of 270°. The crank arm 3 is fixed to the distal end of the output shaft 2b to be rotational integrally with the output shaft 2b.

As shown in FIG. 2, the crank arm 3 extends in a direction perpendicular to the axis L1 of the output shaft 2b. A tubular portion 3a is formed at the distal end of the crank arm 3. The tubular portion 3a extends along an axis L2 (L2a and L2b in FIG. 3), which is parallel to the axis L1 of the output shaft 2b. The tubular portion 3a supports the slide member 4 such that the slide member 4 is rotational about the axis L2.

Figure 3:
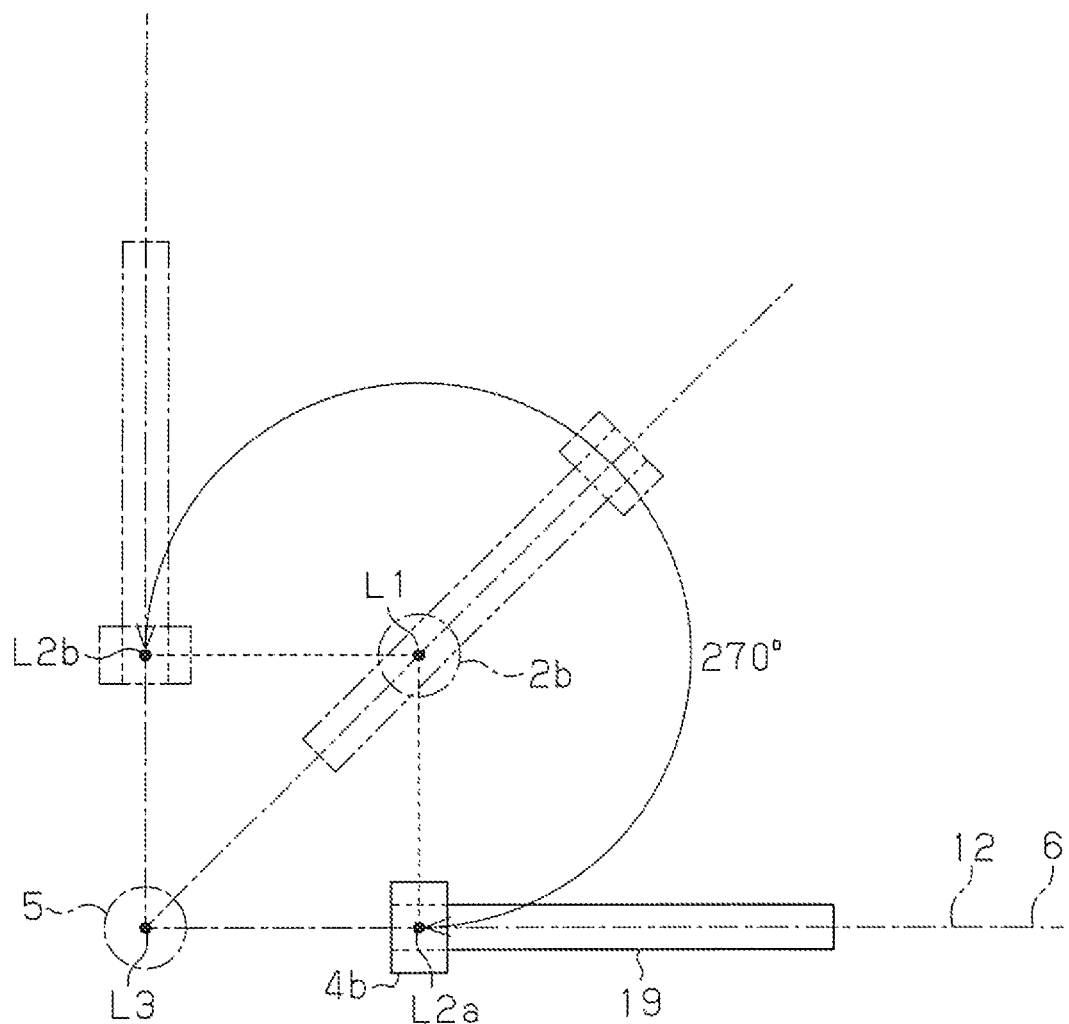
FIG. 3 is an explanatory diagram showing operation of the wiper device shown in FIG. 1.

The slide member 4 has a shaft portion 4a, which is inserted into the tubular portion 3a, and an arcuate movement portion 4b, which protrudes from the tubular portion 3a. The arcuate movement portion 4b is formed as a hollow tube that extends in a direction perpendicular to the axis L2. As shown in FIG. 3, as viewed in a direction, parallel to the axes L1, L2, the arcuate movement portion 4b is movable in an arc with the center coinciding with the axis L1 when the output shaft 2b rotates.

The pivot shaft 5 is fixed in the base 7 at a position offset from the axis L1 (shaft center) of the output shaft 2b, and extends along an axis L3, which is parallel to the axis L1. As shown in FIG. 3, the pivot shaft 5 of the present embodiment is located at a position that is opposite from the middle position in the arcuate movement, of the arcuate movement portion 4b about the output shaft 2b, that is, at a circumferential position reached by rotating about the axis L2 by 180°, and separated from the axis L2 by a distance obtained by multiplying the rotational radius of the arcuate movement portion 4b by 1.414. In other words, as viewed in a direction parallel to the axes L1, L3, the pivot shaft 5 of the present embodiment (axis L3) is located at a position that is one of the four corners of a square with the other three corners being the output shaft 2b (axis L1), and the ends of the rotational movement of the arcuate movement portion 4b. The pivot shaft 5 rotationally supports the proximal end of the wiper 6.

Specifically, as shown in FIG. 1, the wiper 6 is formed by a wiper arm 11 and a wiper blade (not shown) coupled to the distal end of the wiper arm 11. The proximal end of the wiper arm 11 includes an arm head 12, which serves as a lever member supported by the pivot shaft 5, and a retainer 13, which is coupled to the distal end of the arm head 12.

The arm head 12 includes an elongated arm head main body 14, an upper cover 15, and a lower cover 16. A tubular support 14a is formed below the proximal end of the arm head main body 14. The tubular support 14a is fitted about the pivot shaft 5, so that the arm head main body 14 is rotational about the pivot shaft 5.

An accommodating hole 14b is formed in a middle portion of the arm head main body 14 with respect to the longitudinal direction. The accommodating hole 14b extends through the arm head main body 14 in the vertical direction, or in a direction along the axes L1 to L3. The accommodating hole 14b also extends in the longitudinal direction of the wiper 6. A recess 14d is formed in an upper portion of the proximal end of the arm head main body 14. The recess 14d is separated from the accommodating hole 14b by a wall 14c. The accommodating hole 14b has a pair of inner surfaces, which extends in the longitudinal direction of the wiper 6 and supports the slide shaft 19. Specifically, the wall 14c, which is a first inner surface, has a through hole 14e, which extends in the longitudinal direction of the wall 14c to connect the accommodating hole 14b to the recess 14d. A supporting recess 14f is formed in the second inner surface. The supporting recess 14f extends in the longitudinal direction (direction in which the through hole 14e extends). A permitting through hole 14g is formed below the supporting through hole 14e. The permitting through hole 14g permits an elongated plate-like movable closing member 17, which will be discussed below, to be moved in the longitudinal direction.

The upper cover 15 is fixed to the top of the arm head main body 14 to close the upper opening of the accommodating hole 14b and the recess 14d. The lower cover 16 is fixed to the bottom of the arm head main body 14. The lower cover 16 has an elongated hole 16a at a position that corresponds to the accommodating hole 14b. In the present embodiment, with the upper cover 15 and the lower cover 16 fixed to the arm head main body 14, the inner surface of the accommodating hole 14b, the upper cover 15, and the elongated hole 16a form an accommodating portion 18, which has the elongated hole 16a as an opening, in the arm head 12. Although FIG. 1 illustrates a state in which the upper cover 15 is not fixed to the arm head main body 14, the reference numeral is attached to a part that corresponds to the accommodating portion 18, for the illustrative purposes. As shown in FIG. 2, a permitting recess 16b is formed in the upper surface of the lower cover 16. The permitting recess 16b, together with the permitting through hole 14g, permits the movable closing member 17 to be moved in the longitudinal direction.

As shown in FIG. 1, the ends of the slide shaft 19 are supported by the supporting through hole 14e and the supporting recess 14f, respectively. The arcuate movement portion 4b of the slide member 4 is accommodated in the accommodating portion 18 and fitted about the slide shaft 19. This allows the arcuate movement portion 4b to be slid in the longitudinal direction in the accommodating portion 18.

As described above, the permitting recess 16b and the permitting through hole 14g allow the movable closing member 17 to move in the longitudinal direction. The shaft portion 4a of the slide member 4 is inserted into a middle hole 17a of the movable closing member 17 and into the tubular portion 3a of the crank arm 3. Accordingly, irrespective of the position of the arcuate movement portion 4b in the accommodating portion 18, the movable closing member 17 is slid (moved) integrally with the arcuate movement portion 4b to close the opening of the accommodating portion 18 (that is, the elongated hole 16a).

Operation of the wiper device will now be described.

For example, when the motor main body 2 is driven based on manipulation of an operation switch, the output shaft 2b is rotated in a reciprocating manner within an angular range of 270°. Accordingly, the arcuate movement portion 4b performs arcuate movement (reciprocation). Then, the arcuate movement portion 4b urges the arm head 12 (in the rotating direction) via the slide shaft 19, while sliding along the slide shaft 19 in the accommodating hole 14b (in the longitudinal direction). That is, the arcuate movement portion 4b urges the arm head 12 while changing the position of engagement with the slide shaft 19 (the arm head 12).

Specifically, for example, as shown in FIG. 3, when the arcuate movement portion 4b is rotated (in an arcuate movement) from a first rotation end (the end in the clockwise direction as viewed in FIG. 3, that is, the position corresponding to L2a, which is a reference position) to the middle position in the rotation range by 135° (arcuate movement), the arcuate movement portion 4b rotates the arm head 12 by 45°, while sliding from the proximal end to the distal end of the slide shaft 19. Further, when the arcuate movement portion 4b is rotated (in an arcuate movement) from the middle position in the rotation range to a second rotation end (the end in the counterclockwise direction as viewed in FIG. 3, that is, the position corresponding to L2b) by 135° (arcuate movement), the arcuate movement portion 4b rotates the arm head 12 by 45°, while sliding from the distal end to the proximal end of the slide shaft 19. Reciprocation is performed through such operation, so that the arm head 12, together with the wiper 6, is caused to rotate in a reciprocating manner within the angular range of 90° to perform wiping action.

The above embodiment has the following advantages.

Figure 4:
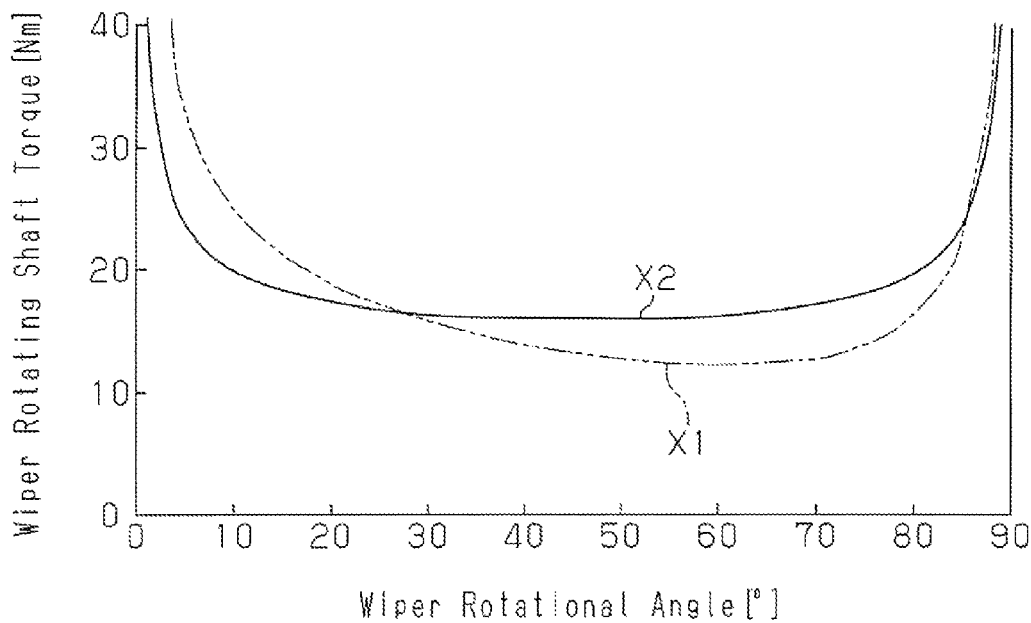
FIG. 4 is a characteristic diagram showing the relationship between the wiper rotational angle and the wiper rotating shaft torque in the wiper device shown in FIG. 1.
Figure 5:
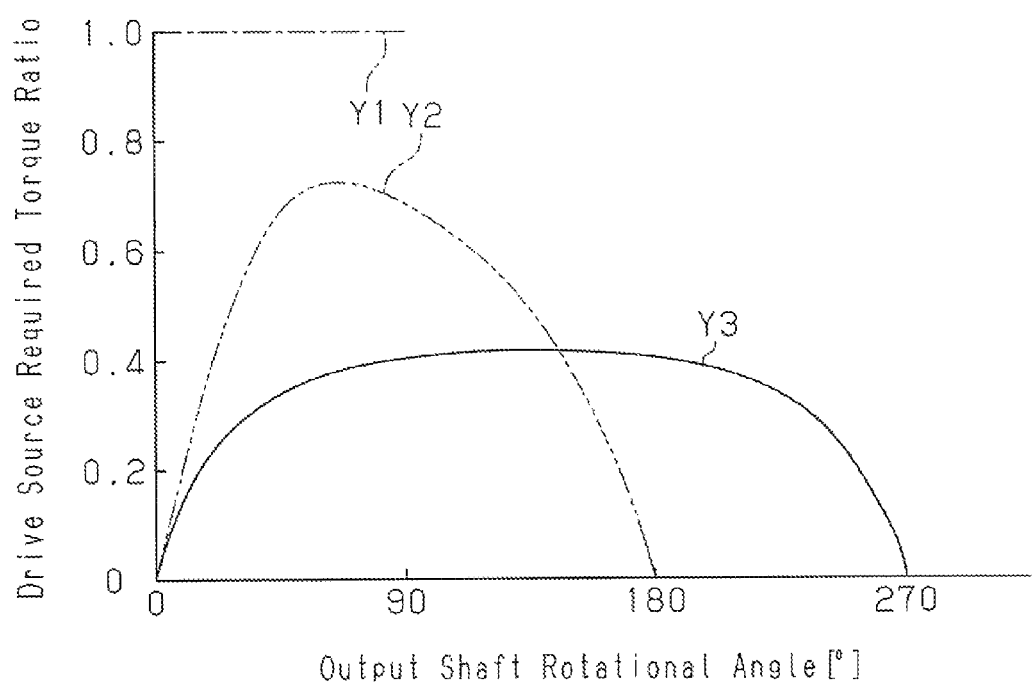
FIG. 5 is a characteristic diagram showing the relationship between the output shaft rotational angle and the drive source required torque ratio in the wiper device shown in FIG. 1.
Figure 6:
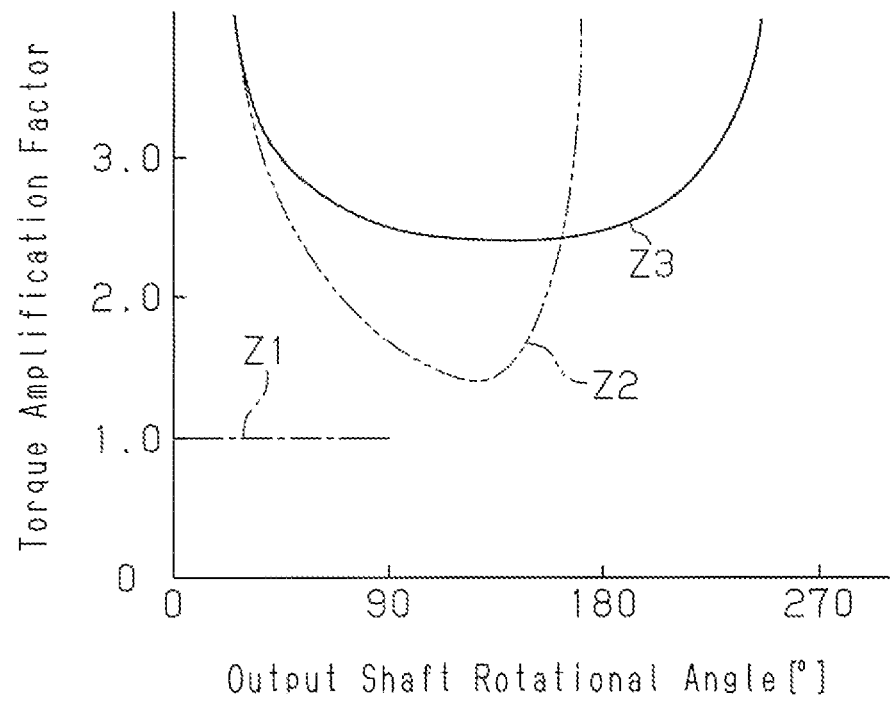
FIG. 6 is a characteristic diagram showing the relationship between the output shaft rotational angle and the torque amplification factor in the wiper device shown in FIG. 1.

(1) A wiper device that has a conventional four-bar linkage causes a wiper to reciprocate once by rotating the output shaft one turn, that is, the wiper is swung halfway by rotating the output shaft within the angular range of 180°. The wiper device of the present embodiment rotates the output shaft 2b within an annular range of 270°, which is greater than 180°, to swing the wiper 6 one way (in the present embodiment, by 90°). Compared to a wiper device having a conventional four-bar linkage, the torque from the output shaft 2b to the wiper 6 is increased (refer to FIG. 4). FIG. 4 is a characteristic diagram showing the relationship between the wiper rotational angle and the wiper rotating shaft torque in a wiper device having a conventional four-bar linkage and the wiper device of the present embodiment. Either wiper device uses the same drive source that rotates an output shaft, by 10 Nm. Characteristic X1 represents the wiper rotating shaft torque of a wiper device having a conventional four-bar linkage, and characteristic X2 represents the wiper rotating shaft torque of the wiper device according to the present embodiment. The present embodiment has a greater value for the minimum torque. Accordingly, as shown in FIG. 5, it is possible to reduce the torque generated by a drive source (the motor main body, in the present embodiment), which is required for rotating the wiper 6 with a predetermined torque. The size of the drive source (the motor main body 2) thus can be reduced. FIG. 5 is a characteristic diagram showing the relationship between the output shaft rotational angle and the drive source required torque in a conventional direct drive wiper device, a wiper device having a conventional four-bar linkage, and the wiper device of the present embodiment. To rotate the wiper 6 with a predetermined torque, the conventional direct drive wiper device (characteristic Y1) requires a drive source that generates a torque of 1.0, whereas the wiper device having the conventional four-bar linkage (characteristic Y2) requires a drive source that generates a torque of approximately 0.7 maximum. Further, the wiper device of the present embodiment (characteristic Y3) only requires a drive source that generates a torque of 0.4 maximum (40% of the case, of the direct drive type) maximum. This is easily understood from FIG. 6 (a characteristic diagram of the output shaft rotational angle and the torque amplification factor), which shows the effect of torque increase achieved by the linkages. That is, since the conventional direct drive wiper device (characteristic Z1) has no linkage, its torque amplification factor is 1.0. The wiper device (characteristic Z2) having a conventional four-bar linkage, has a torque amplification factor of 1.4, while the wiper device of the present embodiment (characteristic Z3) has a torque amplification factor of 2.4. Accordingly, the required torque for the output shaft (torque that the drive source is required to generate) is reduced.

In a state where the wiper 6 is at the middle of the rotational range, the engagement position between the arcuate movement port ion 4b and the arm head 12, or a point of action, is far from the position of the pivot shaft 5, which is a fulcrum. Thus, even if the wiper 6 receives an external force caused, for example, by snow, the output shaft 2b receives a relatively small force. Therefore, for example, if a mechanism for dealing with such external forces is employed, the mechanism is easily protected. In other words, when the wiper arm (specifically, a part about the pivot shaft 5) receives external force, the external force is directly applied to the output shaft in the conventional direct drive wiper device (characteristic Y1). In contrast, the drive source required torque ratios in the wiper devices having the above described linkages are as follows. That is, in the wiper device having a conventional four-bar linkage (characteristic Y2), the drive source required torque ratio is approximately 0.7. Further, in the present embodiment (characteristic Y3), the drive source required torque ratio is approximately 0.4 maximum (40% of that of the direct drive type). Accordingly, the speed reducing mechanism of the drive source (the speed reduction gear located in the path from the rotary shaft of the motor main body to the output shaft) can be reduced in size.

(2) The arm head 12 has the accommodating portion 18, which extends in the longitudinal direction of the wiper 6, and the arcuate movement portion 4b is arranged in the accommodating portion 18 to be slidable in the longitudinal direction. Therefore, the arcuate movement portion 4b can be located outside the vehicle body and reduced in size. Also, the appearance of the arcuate movement portion 4b is improved. Further, compared to a configuration in which the arcuate movement portion 4b is located in the vehicle body, the sizes of components located in the vehicle body are reduced. This reduces installation space in the vehicle body, which facilitates the installation.

(3) The wiper device 1 of the present embodiment includes the movable closing member 17, which is moved integrally with the arcuate movement portion 4b to close the opening of the accommodating portion 18 (that is, the elongated hole 16a) regardless of the position of the arcuate movement portion 4b in the accommodating portion 18. Thus, for example, foreign matter is prevented from entering the accommodating portion 18, and the sliding movement of the arcuate movement portion 4b is prevented from being hindered by foreign matter.

The above described embodiment may be modified as follows.

In the above illustrated embodiment, the arcuate movement portion 4b is accommodated in the accommodating portion 18 of the arm head 12. However, the present invention is not restricted to this, and a configuration of FIGS. 7 to 9 may be employed, for example.

Figure 7:
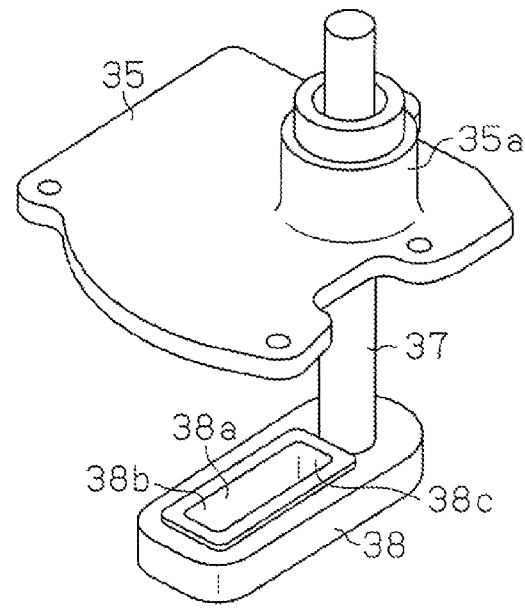
FIG. 7 is a partially exploded perspective view illustrating a wiper device according to a second embodiment of the present invention.
Figure 7:
Figure 7:
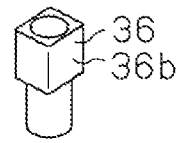
Figure 7:
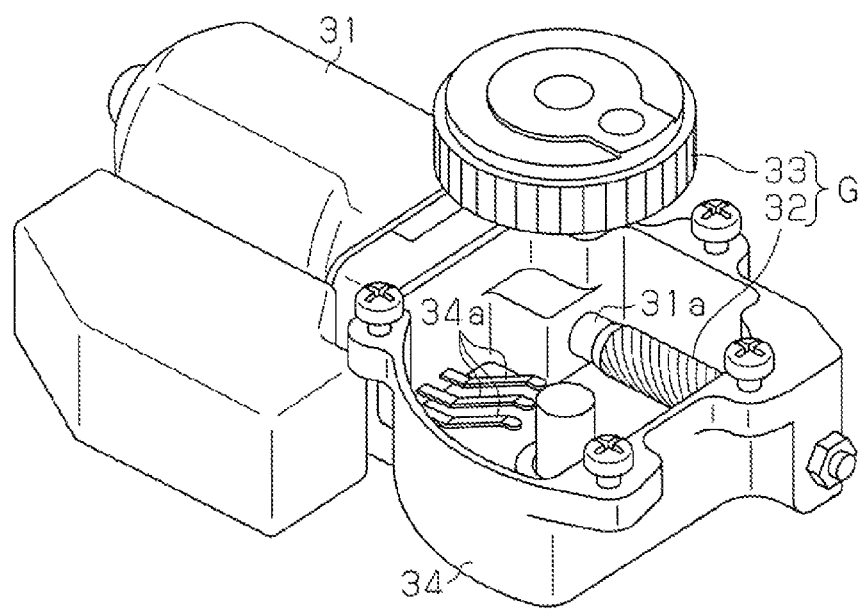

In this modification (see FIGS. 7 to 9), a motor main body 31 and a worm, gear G, which serves as a reduction gear, form a drive source. The worm gear G includes a worm 32 and a worm wheel 33. Specifically, as shown in FIG. 7, the worm 32 and the worm wheel 33, which form the worm gear G, are rotationally supported in a gear housing 34 and a cover 35, which serve as a case fixed to a motor main body 31. The worm 32 is attached to a rotary shaft 31a, which is rotated by the motor main body 31, to rotate integrally with the rotary shaft 31a. The worm 32 is meshed with the worm wheel 33, which serves as an output shaft. The wiper device of this modification includes a sensor for detecting rotational angle. The sensor is capable of detecting the rotational angle of the worm wheel 33, so that the worm wheel 33 is rotated in a reciprocating manner within a predetermined angular range of 270°. The sensor includes a conductor pattern D (see FIG. 9) and contact pins 34a located in the gear housing 34 (see FIG. 7). The conductor pattern D is formed on a second end face, which is one of the axial, end faces of the worm wheel 33. The second end face is a back surface and faces the gear housing 34. The contact pins 34a slide on the conductor pattern D. That is, the motor main body 31 rotates the worm wheel 33 in a reciprocating manner within an angular range of 270°, while detecting the rotational angle of the worm, wheel 33 using the conductor pattern D and the contact pins 34a. The contact pins 34a of the present modification are arranged at positions offset from the worm wheel 33 in the radial direction. The contact pins 34a each slide on one of three circles R1 to R3 shown by lines formed by a long dash alternating with two short dashes in FIG. 9. Circle R2 is located outside the circle R1, and circle R3 is located inside circle R1. The conductor pattern D includes an annular portion D1, which corresponds to circle R1, a stopping range portion D2, which corresponds to circle R2 and partially protrudes outward from the outer circumference of the annular portion D1, a lower reversal distinguishing portion D3, which corresponds to circle R3 and partially protrudes from the inner circumference of the annular portion D1. The stopping range portion D2 allows the worm wheel 33 to be stopped at 270°, that is, the stopping range portion D2 is capable of limiting the rotational range of the worm wheel 33 within 270°. The lower reversal distinguishing portion D3 is capable of distinguishing the position of the lower reversal of the wiper 6. On the first end face of the worm wheel 33, that is, on the front face of the worm wheel 33, an arcuate movement portion 36 is provided at a position offset from the axis of the worm wheel 33. The arcuate movement portion 36 protrudes from the front face and is rotational about the own axis. The arcuate movement portion 36 performs arcuate movement as the worm wheel 33 rotates. The arcuate movement portion 36 of the present modification has a rectangular shape as viewed in the axial direction. The arcuate movement portion 36 is made of metal and has a plastic support member 36a at the distal end facing the cover 35. The support member 36a slides on the inner surface of the cover 35 and receives the spring pressure caused by contact with the contact pins 34a.

Figure 8:
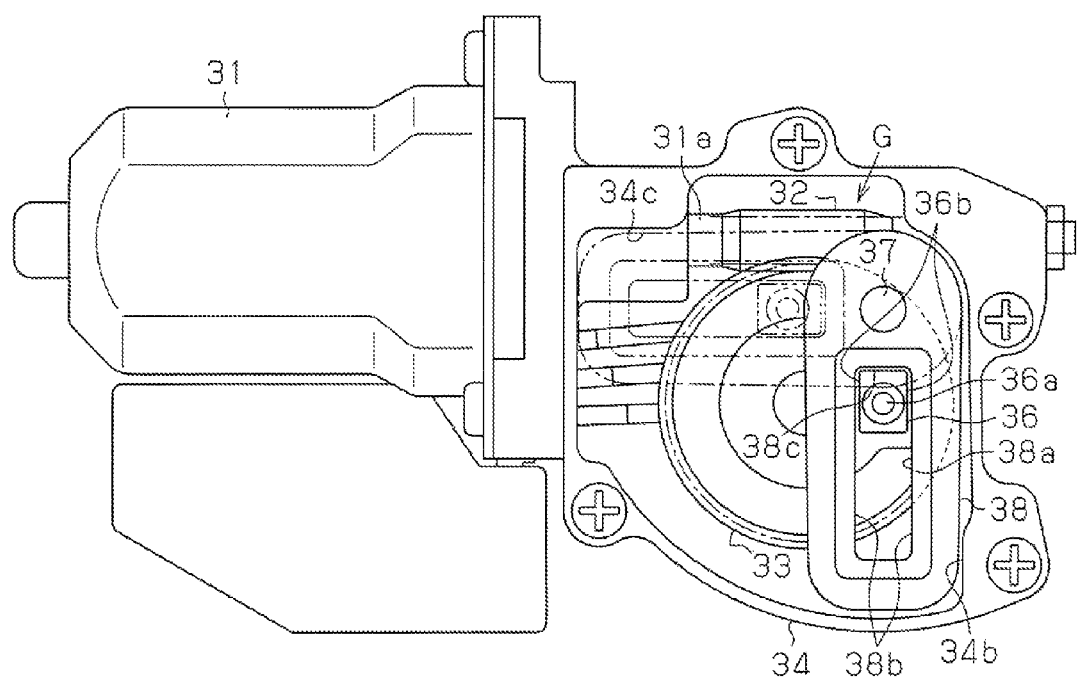
FIG. 8 is a partially plan view of the wiper device shown in FIG. 7.
Figure 9:
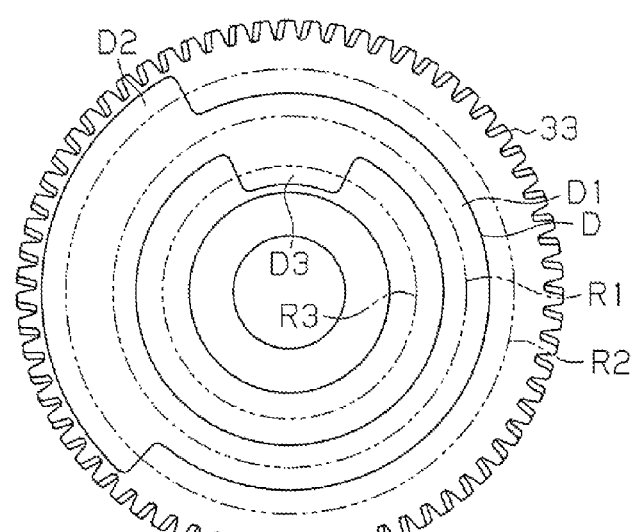
FIG. 9 is an explanatory bottom view showing the worm wheel and conductor pattern in the wiper device shown in FIG. 7.

As shown in FIG. 7, the cover 35 has a support cylinder portion 35a formed at a position offset from the axis of the worm, wheel 33. The support cylinder portion 35a receives and rotationally supports the pivot shaft 37. As illustrated in FIG. 8, the pivot shaft 37 is arranged to overlap with the worm gear G (the worm wheel 33 in this modification) when viewed in the axial direction. In other words, as viewed in the axial direction of the pivot shaft 37, at least part of the pivot shaft 37 is located within the area of the outline of the worm gear G (the worm 32 and the worm wheel 33). The lower end of the pivot shaft 37 is located in the gear housing 34 and is fixed to the lever member 38. The lever member 38 is formed like an elongated plate that extends from the pivot shaft 37 in the radial direction of the pivot shaft 37. The lever member 38 has a slide permitting hole 38a, which extends in the longitudinal direction of the lever member 38 and serves as an accommodating portion. The slide permitting hole 38a has a pair of parallel inner surfaces 38b (refer to FIG. 8), which extends in the longitudinal direction, and is shaped substantially like a rectangle to permit the arcuate movement portion 36 inserted in the hole 38a to slide in the longitudinal direction. In other words, the arcuate movement portion 36 is rectangular as viewed in the axial direction and has a pair of parallel flat surfaces 36b so that the arcuate movement portion 36 is slidable in the slide permitting hole 38a in the longitudinal direction of the lever member 38. An end (inner surface) 38c of the slide permitting hole 38a in the longitudinal direction is formed at a position to restrict rotation in a reciprocating manner of the worm wheel 33 beyond a predetermined angular range (270°) set by the sensor (the conductor pattern D and the contact pins 34a). That is, the longitudinal direction end 38c collides with the arcuate movement portion 36 when the worm wheel 33 is rotated to a position beyond the angular range of 270° of the worm wheel 33, and restricts further rotation.

In this modification also, when the worm wheel 33 is rotated in a reciprocating manner within an angular range of 270°, the lever member 38 is rotated in a reciprocating manner within an angular range of 90°, like the movement shown, in FIG. 3. As shown in FIG. 8, the gear housing 34 has stopper portions 34b, 34c, which prevent the lever member 38 from being rotated beyond the reciprocating rotation range (the angular range of 90° indicated by solid lines and lines formed by a long dash alternating with two short dashes) by the arcuate movement portion 36. That is, when the lever member 38 is rotated to a position beyond the angular range of 90° (for example, by 2°), the stopper portions 34b, 34c, which are formed on the inner wall of the gear housing 34 contact the lever member 38, thereby restricting further rotation.

A part of the lever member 38 that corresponds to the slide permitting hole 38a is formed of plastic to allow the arcuate movement portion 36 to smoothly slide. The remainder of the lever member 38 is made of metal. The upper end of the pivot shaft 37 is located outside the gear housing 34 and is fixed to a wiper (an arm head), which is not illustrated.

The above modification has the same advantage as (1) of the illustrated embodiment. For example, the diameter of the worm wheel 33 of the motor main body 31 and the reduction gear G, which form a drive source, can be reduced in size, so that the drive source is reduced in size.

Also, the worm wheel 33, which serves as an output shaft, the arcuate movement portion 36, and the lever member 38 can be accommodated in a single case (the gear housing 34 and the cover 35). Thus, it is possible, with a simple structure (a single case), to prevent movements (rotation, arcuate movement, and sliding) of the components from being hindered by foreign matter.

The drive source is formed by the motor main body 31 and the worm gear G, and the output shaft is the worm wheel 33 of the worm gear G. Thus, compared to a wiper device that does not include the worm gear G, it is possible to reduce the torque that must be generated by the motor main body 31 to rotate the wiper with a predetermined torque.

The arcuate movement portion 36 is arranged to protrude from the first end face of the worm wheel 33. Therefore, compared to a structure in which a separate lever that extends to a position offset from the axis of the worm wheel and an arcuate movement portion is provided at the distal end of the lever, the structure of the modification is simplified and the rigidity of the arcuate movement portion 36 is easily increased.

Since the conductor pattern D is provided on the second end face (back face) of the worm wheel 33, it is possible to arrange the arcuate movement portion 36 on the first end face of the worm wheel 33, while simplifying the structure of the sensor (the conductor pattern D and the contact pins 34a).

The pivot shaft 37 is arranged to overlap with the worm gear G (the worm wheel 33 in this modification) when viewed in the axial direction. Therefore, compared to a case in which the pivot shaft 37 is arranged not to overlap with the worm gear G, the size of the pivot shaft 37 as viewed in the axial direction (the projected area) is reduced.

The gear housing 34, which accommodates the worm gear G, has the stopper portions 34b, 34c, which prevent the lever member 38 from being rotated beyond the reciprocating rotation range (the angular range of 90° indicated by solid lines and lines formed by a long dash alternating with two short dashes) of the arcuate movement portion 36. Thus, for example, if the lever member 38 is rotated to a position beyond the range of the reciprocating rotation range (90°) of the arcuate movement portion 36 (for example, by 2°), the stopper portions 34b, 34c prevent further rotation. Therefore, with a simple structure, the arcuate movement portion 36 is prevented, for example, from receiving great force.

The arcuate movement portion 36 is formed to be rectangular as viewed in the axial direction and has a pair of parallel flat surfaces 36b, which are slidable on a pair of parallel inner surfaces 38b extending in the longitudinal direction of the slide permitting hole 38a of the lever member 38. Thus, the surface pressure between the arcuate movement portion 36 and the lever member 38 is lowered (the surface pressure is prevented from being locally increased). Thus, the sliding surfaces are prevented from being deformed by locally increased surface pressure.

Only a part of the lever member 38 that corresponds to the slide permitting hole 38a is formed of plastic, and the remainder of the lever member 38 is made of metal. The arcuate movement portion 36 is made of metal. Thus, the frictional force generated by sliding of the lever member 38 and the arcuate movement portion 36 is reduced, while maintaining the rigidity (the load bearing property) of the lever member 38.

The longitudinal direction end 38c of the slide permitting hole 38a is formed at a position for restricting rotation in a reciprocating manner of the worm wheel 33 beyond a predetermined angular range (270°) set by the sensor (the conductor pattern D and the contact pins 34a). Thus, for example, even in a case in which the sensor is broken, when the worm wheel 33 is rotated to a position beyond a predetermined angular range (27°) (for example, by 3°), the longitudinal direction end 38c (mechanically) restricts further rotation. Therefore, with a simple structure, it is possible to prevent any action that is significantly different from prescribed actions.

In the above illustrated embodiment, the movable closing member 17 is moved integrally with the arcuate movement portion 4b to close the accommodating portion 18 (or the elongated hole 16a). The present invention is not restricted to this configuration, but a closing member made of, for example, rubber may be employed that closes the opening (or the elongated hole 16a), while being flexed to allow sliding movement of the arcuate movement portion 4b (the slide member 4).

In the above illustrated embodiment, the wiper device 1 causes the output shaft 2b (the worm wheel 33) to rotate in a reciprocating manner within an angular range of 270°. Instead, the wiper device may cause the output shaft 2b (the worm wheel 33) to rotate in a reciprocating manner within another angular range that is greater than 180° and smaller than 360°. In the above illustrated embodiment, the wiper device 1 causes the wiper 6 to rotate in a reciprocating manner within, an angular range of 90°. Instead, the wiper device may cause the wiper 6 to rotate in another angular range (for example, 110°).

In the above illustrated embodiment, the present invention is applied to a wiper device. However, the present invention may be applied to other drive units that rotate a driven member other than a wiper in a reciprocating manner. For example, the present invention may be applied to a mirror drive unit for a large-sized vehicle such as a truck. In this case, a mirror lever member, which supports a mirror, extends from a side corresponding to the passenger seat and serves as a driven member. The mirror lever member is rotated in a reciprocating manner between a use state (the farthest state), in which the mirror lever largely protrudes outward from the vehicle body, and a folded state (the closest state). In this case also, the drive source of the mirror drive unit can be reduced in size, which facilitates installation.

What is claimed is:

1. A drive unit comprising:
an output shaft;
a drive source, which causes the output shaft to rotate in a reciprocating manner within a first angular range larger than 180° and less than 360°;
an arcuate movement portion, which is located at a position offset from the axis of the output shaft and is integrally rotational with the output shaft, wherein the arcuate movement portion performs arcuate movement about the axis of the output shaft as the output shaft is rotated;
a pivot shaft, which is located at a position offset from the axis of the output shaft; and
a lever member, which is rotational about the axis of the pivot shaft and is engaged with the arcuate movement portion, wherein, as the arcuate movement portion performs arcuate movement, the lever member is urged by the arcuate movement portion while an engaging position between the arcuate movement portion and the lever member varies, and wherein the lever member is rotated in a reciprocating manner within a second angular range, which is smaller than the first angular range, to cause a driven member to integrally rotate in a reciprocating manner, wherein the drive source includes a motor main body and a worm gear, and
the output shaft is a worm wheel of the worm gear.

2. The drive unit according to claim 1, further comprising a single case for accommodating the output shaft, the arcuate movement portion, and the lever member.

3. The drive unit according to claim 1, wherein the arcuate movement portion is located at a first end face of a pair of end faces of the worm wheel in the axial direction.

4. The drive unit according to claim 3, further comprising a sensor that is capable of detecting the rotational angle of the output shaft, thereby allowing the output shaft to rotate in a reciprocating manner within the first, angular range,
wherein the sensor includes a conductor pattern formed on a second end face of the worm wheel and a contact pin, which slides on the conductor pattern.

5. The drive unit according to claim 1, wherein the pivot shaft, is arranged to overlap with the worm gear as viewed in the axial direction of the pivot shaft.

6. The drive unit according to claim 1, further comprising a gear housing for accommodating the worm gear, wherein the gear housing includes a stopper portion for restricting the lever member from rotating beyond the second angular range.

7. The drive unit according to claim 1, wherein the lever member has an accommodating portion that is substantially rectangular as viewed in the axial direction of the lever member, the accommodating portion having a pair of parallel inner surfaces extending in the longitudinal direction of the accommodating portion,
the arcuate movement portion is slidable on the parallel inner surfaces so that the arcuate movement portion is slidable in the longitudinal direction in the accommodating portion,
only a part of the lever member that forms the accommodating portion is formed of plastic, and the remainder of the lever member is made of metal, and
the arcuate movement portion is made of metal.

8. The drive unit according to claim 1, wherein the first angular range is 270° and the second angular range is 90°.

9. The drive unit according to claim 1, wherein the driven member is a wiper.

10. A drive unit comprising:
an output shaft;
a drive source, which causes the output shaft to rotate in a reciprocating manner within a first angular range larger than 180° and less than 360°;
an arcuate movement portion, which is located at a position offset from the axis of the output shaft and is integrally rotational with the output shaft, wherein the arcuate movement portion performs arcuate movement about the axis of the output shaft as the output shaft is rotated;
a pivot shaft, which is located at a position offset from the axis of the output shaft; and
a lever member, which is rotational about the axis of the pivot shaft and is engaged with the arcuate movement portion, wherein, as the arcuate movement portion performs arcuate movement, the lever member is urged by the arcuate movement portion while an engaging position between the arcuate movement portion and the lever member varies, and wherein the lever member is rotated in a reciprocating manner within a second angular range, which is smaller than the first angular range, to cause a driven member to integrally rotate in a reciprocating manner, wherein
the lever member has an accommodating portion that is substantially rectangular as viewed in the axial direction of the lever member, the accommodating portion having a pair of parallel inner surfaces extending in the longitudinal direction of the accommodating portion, and the arcuate movement portion has a pair of parallel flat surfaces, which is slidable on the parallel inner surfaces so that the arcuate movement portion is slidable in the longitudinal direction of the lever member in the accommodating portion.

11. The drive unit according to claim 10, further comprising a single case for accommodating the output shaft, the arcuate movement portion, and the lever member.

12. The drive unit according to claim 10, wherein the lever member has an accommodating portion that is substantially rectangular as viewed in the axial direction of the lever member, the accommodating portion having a pair of parallel inner surfaces extending in the longitudinal direction of the accommodating portion, the arcuate movement portion is slidable on the parallel inner surfaces so that the arcuate movement portion is slidable in the longitudinal direction in the accommodating portion, only a part of the lever member that forms the accommodating portion is formed of plastic, and the remainder of the lever member is made of metal, and the arcuate movement portion is made of metal.

13. The drive unit according to claim 10, wherein the first angular range is 270° and the second angular range is 90°.

14. The drive unit according to claim 10, wherein the driven member is a wiper.

15. A drive unit comprising;

an output shaft;

a drive source, which causes the output shaft to rotate in a reciprocating manner within a first angular range larger than 180° and less than 360°;

an arcuate movement portion, which is located at a position offset from the axis of the output shaft and is integrally rotational with the output shaft, wherein the arcuate movement portion performs arcuate movement about the axis of the output shaft as the output shaft is rotated;

a pivot shaft, which is located at a position offset from the axis of the output shaft;

a lever member, which is rotational about the axis of the pivot shaft and is engaged with the arcuate movement portion, wherein, as the arcuate movement portion performs arcuate movement, the lever member is urged by the arcuate movement portion while an engaging position between the arcuate movement portion and the lever member varies, and wherein the lever member is rotated in a reciprocating manner within a second angular range, which is smaller than the first angular range, to cause a driven member to integrally rotate in a reciprocating manner; and a sensor that is capable of detecting the rotational angle of the output shaft, thereby allowing the output shaft to rotate in a reciprocating manner within the first angular range, wherein the lever member includes an accommodating portion that is substantially rectangular as viewed in the axial direction of the lever member, the arcuate movement portion is slidable in the longitudinal direction in the accommodating portion, and a longitudinal direction end of the accommodating portion is formed at a position for restricting rotation in a reciprocating manner of the output shaft beyond the first angular range.

16. The drive unit according to claim 15, further comprising a single case for accommodating the output shaft, the arcuate movement portion, and the lever member.

17. The drive unit according to claim 15, wherein the lever member has an accommodating portion that is substantially rectangular as viewed in the axial direction of the lever member, the accommodating portion having a pair of parallel inner surfaces extending in the longitudinal direction of the accommodating portion, the arcuate movement portion is slidable on the parallel inner surfaces so that the arcuate movement portion is slidable in the longitudinal direction in the accommodating portion, only a part of the lever member that forms the accommodating portion is formed of plastic, and the remainder of the lever member is made of metal, and the arcuate movement portion is made of metal.

18. The drive unit according to claim 15, wherein the first angular range is 270° and the second angular range is 90°.

19. The drive unit according to claim 15, wherein the driven member is a wiper.

* * * * *